United States Patent
Acharya et al.

(10) Patent No.: US 7,518,990 B2
(45) Date of Patent: Apr. 14, 2009

(54) ROUTE DETERMINATION METHOD AND APPARATUS FOR VIRTUALLY-CONCATENATED DATA TRAFFIC

(75) Inventors: Swarup Acharya, New Providence, NJ (US); Bhawna Gupta, Edison, NJ (US); Pankaj Risbood, Roselle, NJ (US); Anurag Srivastava, Roselle, NJ (US)

(73) Assignee: Alcatel Lucent USA Inc., Murray Hill, NJ (US)

( * ) Notice: Subject to any disclaimer, the term of this patent is extended or adjusted under 35 U.S.C. 154(b) by 1104 days.

(21) Appl. No.: 10/745,881

(22) Filed: Dec. 26, 2003

(65) Prior Publication Data

US 2005/0147081 A1   Jul. 7, 2005

(51) Int. Cl.
*G01R 31/08* (2006.01)
(52) U.S. Cl. .............. 370/225; 370/235; 370/395.4; 370/468
(58) Field of Classification Search ............ 370/351, 370/225, 235, 395.4, 468
See application file for complete search history.

(56) References Cited

U.S. PATENT DOCUMENTS

| | | | |
|---|---|---|---|
| 6,934,259 B2 * | 8/2005 | Klincewicz et al. ......... | 370/238 |
| 2001/0046206 A1 * | 11/2001 | Chan et al. .................. | 370/222 |
| 2002/0181479 A1 * | 12/2002 | Okuno ........................ | 370/404 |
| 2003/0074449 A1 * | 4/2003 | Smith et al. ................. | 709/226 |
| 2003/0219010 A1 * | 11/2003 | Peng ........................... | 370/352 |
| 2007/0121507 A1 * | 5/2007 | Manzalini et al. .......... | 370/235 |

OTHER PUBLICATIONS

S. Acharya et al., "MöbiPack: Optimal Hitless SONET Defragmentation in Near-Optimal Cost," Twenty-third Annual Joint Conference of the IEEE Computer and Communications Societies (INFOCOM 2004), Mar. 2004, pp. 1819-1829, vol. 3, Hong Kong.
S. Acharya et al., "Hitless Network Engineering of SONET Rings," IEEE Global Telecommunications Conference (GLOBECOM '03), Dec. 2003, pp. 2735-2739, vol. 5.
S. Acharya et al., "PESO: Low Overhead Protection for Ethernet over SONET Transport," Twenty-third Annual Joint Conference of the IEEE Computer and Communications Societies (INFOCOM 2004), Mar. 2004, pp. 165-175, vol. 1, Hong Kong.
Joel Conover, "Networking for the Next Generation," Network Computing, Jun. 2001, 2 pages, vol. 12. No. 13.
U.S. Appl. No. 10/446,220, filed May 28, 2003, S. Acharya et al., "Fast Restoration for Virtually-Concatenated Data Traffic."
J. Edmonds et al., "Theoretical Improvements in Algorithmic Efficiency for Network Flow Problems," Journal of ACM, vol. 19, No. 2, pp. 248-264, Apr. 1972.
James B. Orlin, "A Faster Strongly Polynomial Minimum Cost Flow Algorithm," Proceedings of the 20th ACM Symposium on the Theory of Computing, pp. 377-387, 1988.

* cited by examiner

*Primary Examiner*—Seema S Rao
*Assistant Examiner*—Sai-Ming Chan (57) ABSTRACT

Virtually-concatenated data traffic is routed in a network comprising at least first and second nodes. The first and second nodes may comprise a source-sink node pair, an ingress-egress node pair, or any other pair of network nodes. For a given traffic demand, a plurality of routes for routing the traffic demand through the network are determined. Each of the routes corresponds to a member of a virtually-concatenated group, such that different portions of the traffic demand are assigned to different members of the virtually-concatenated group.

18 Claims, 6 Drawing Sheets

ROUTING ALOGRITHM α

INPUT:
Network $G(V, E)$, new demand $D$ from bandwidth $B$ and the maximum bandwidth $X$ allowed to be impacted on failure.

PROBLEM:
Route $D$ in $G$ such that a single link failure does not affect more than $X$ amount of the traffic.

OUTPUT:
A set of routes for members of the VCG carrying $D$.

ALGORITHM:

Let STS-$F$c and STS-$Y$c be the smallest SONET frame rate that can carry $B$ and $X$ respectively.
For all edges in $E$:
    Set their capacity to highest SONET rate ($N$ units for
    STS-$N$c) they can carry, or to $Y$ units, whichever is smaller.

Find minimum cost flow of $F$ units in $G$.

FIG. 3

ROUTING ALOGRITHM β

INPUT:
Network $G(V, E)$, a traffic demand $D$ of bandwidth $B$.

PROBLEM:
Route the demand $D$ in $G$ such that a single link failure affects the minimum amount of traffic.

OUTPUT:
A set of routes for members of the VCG carrying $D$.

ALGORITHM:

Let STS-$F$c be the smallest SONET frame rate that can carry $B$.
Choose $Y$ between 1 and $F$ by binary search.
    For all edges in $E$:
        Set their capacity to highest SONET rate ($N$ units for
        STS-$N$c) they can carry, or to $Y$ units, whichever is smaller.
    Find minimum cost flow of $F$ units in $G$.

Smallest $Y$ for which $F$ units of flow can be routed in $G$, is the desired solution.

FIG. 4

ROUTING ALGORITHM $\gamma$

INPUT:
Given a graph $G(V, E)$, a traffic demand $D$ of bandwidth $B$.

PROBLEM:
Route $D$ in $G$ with minimum additional protection bandwidth such that a single failure does not impact traffic.

OUTPUT:
A set of routes for members of the VCG carrying $D$.

ALGORITHM:

Let STS-$F$c be the smallest SONET frame rate that can carry $B$.
Choose $Y$ between 1 and $F$ by binary search.
    For all edges in $E$:
        Set their capacity to highest SONET rate ($N$ units for STS-$N$c) they can carry, or to $Y$ units, whichever is smallest.
    Find minimum cost flow of $F + Y$ units in $G$.

Smallest $Y$ for which $F + Y$ units of flow can be routed in $G$, is the desired solution.

ROUTE DETERMINATION METHOD AND APPARATUS FOR VIRTUALLY-CONCATENATED DATA TRAFFIC

FIELD OF THE INVENTION

The present invention relates generally to data communication networks which utilize virtual concatenation. More particularly, the invention relates to techniques for determining routes for virtually-concatenated data traffic so as, for example, to limit traffic impact or facilitate traffic restoration in the event of route failure.

BACKGROUND OF THE INVENTION

As is well known, virtual concatenation (VC) and link capacity adjustment scheme (LCAS) protocols have been developed which allow more efficient use of the existing fixed-bandwidth connections associated with synchronous optical network (SONET) or synchronous digital hierarchy (SDH) network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node, also referred to herein as a sink node. The sink node recombines the streams to reconstruct the original VCG.

The LCAS protocol enhances the basic virtual concatenation functionality described above by allowing so-called "hitless" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

Conventional restoration techniques in the SONET/SDH context are designed to provide fast restoration in the event of route failure, where "fast" restoration generally denotes restoration of the associated data traffic in less than about 50 milliseconds. However, this fast restoration comes at the cost of excessive bandwidth overhead. More specifically, these conventional techniques generally utilize 1+1 primary-backup protection, wherein each primary route has a corresponding backup route, resulting in 100% bandwidth overhead.

It should also be noted that the above-described LCAS protocol takes on the order of 64 or 128 milliseconds, for respective higher order (HO) or lower order (LO) implementations, in order to complete the above-noted temporary removal of members associated with failed routes. This delay is attributable to the refresh timing mechanism of the LCAS protocol. Therefore, the LCAS protocol in its current form is unable to deliver the approximately 50 millisecond fast restoration generally associated with SONET/SDH networks. This not only precludes its use for restoration but also makes SONET 1+1 protection in conjunction with LCAS ineffective.

A possible alternative approach is to transmit the data traffic without providing any protection at the SONET/SDH layer of the network, in the expectation that higher layers, such as an Ethernet layer, will be able to provide a certain measure of protection. For example, in the case of the above-noted EoS data traffic, rapid Ethernet spanning tree protection in the Ethernet layer may be used for restoration in the event of route failure. However, this type of restoration by higher network layers can lead to a number of significant problems, such as disruption of data traffic for up to several seconds, loss and duplication of data, etc.

U.S. patent application Ser. No. 10/446,220 filed May 28, 2003 and entitled "Fast Restoration for Virtually-concatenated Data Traffic," the disclosure of which is incorporated by reference herein, addresses the above-noted issues by providing improved techniques for protection of data traffic against route failure. Advantageously, these techniques in an illustrative embodiment are able to provide fast restoration, on the order of 50 milliseconds or less, while utilizing less than 100% bandwidth overhead. Although particularly well-suited for use with EoS data traffic, the disclosed techniques can also be used with other types of virtually-concatenated data traffic.

Despite the considerable advances provided by the techniques described in the above-cited U.S. patent application Ser. No. 10/446,220, a need remains for further improvements in protecting data traffic against route failure, and more particularly in routing algorithms that are utilized to determine appropriate restoration routes.

SUMMARY OF THE INVENTION

The present invention meets the above-noted need by providing improved routing algorithms for determining routes for virtually-concatenated data traffic, so as to limit the impact of route failures on the data traffic, to facilitate traffic restoration in the event of route failure, or to provide other desirable features. The described routing algorithms, although illustrated in the context of virtually-concatenated data traffic, can also be applied to other types of data traffic.

In accordance with one aspect of the invention, virtually-concatenated data traffic is routed in a network comprising at least first and second nodes. The first and second nodes may comprise a source-sink node pair, an ingress-egress node pair, or any other pair of network nodes. For a given traffic demand, a plurality of routes for routing the traffic demand through the network are determined. Each of the routes corresponds to a member of a virtually-concatenated group, such that different portions of the traffic demand are assigned to different members of the virtually-concatenated group.

The routes may be determined, for example, by a routing algorithm that determines the routes by processing a graph or other representation of the network.

In a first illustrative embodiment, the routing algorithm determines the routes in a manner that ensures that failure of a single link in the network does not affect more than a designated maximum amount X of a bandwidth B of the traffic demand.

In a second illustrative embodiment, the routing algorithm determines the routes in a manner that ensures that failure of a single link in the network affects a minimum amount of the bandwidth B of the traffic demand.

In a third illustrative embodiment, the routing algorithm determines the routes in a manner that requires only a minimum amount of additional protection bandwidth to ensure that failure of a single link in the network will not affect the bandwidth B of the traffic demand.

In a fourth illustrative embodiment, the routing algorithm determines the routes in a manner that provides a designated number M of the members of the virtually-concatenated group with 1+1 primary-backup protection, wherein each primary route has a corresponding backup route, while a designated number K of the members of the virtually-concatenated group are not provided with such protection.

Advantageously, the routing algorithms in the illustrative embodiments facilitate implementation of low-overhead, standards-compliant fast restoration techniques for virtually-concatenated EoS data traffic or other types of data traffic.

DETAILED DESCRIPTION OF THE INVENTION

The invention will be illustrated herein in conjunction with illustrative embodiments of routing algorithms and associated restoration techniques, as well as a network-based system and example network nodes in which the restoration techniques may be implemented. It should be understood, however, that the invention is not limited to use with the particular routing algorithms, restoration techniques, network-based system or network node implementations described, but is instead more generally applicable to any routing application in which it is desirable to provide improved restoration performance.

The present invention in the illustrative embodiments to be described provides improved routing algorithms for use in determining restoration routes for Ethernet over SONET (EoS) and other types of data traffic which utilize virtual concatenation.

The determined routes may be used in conjunction with a network protection technique which involves configuring a virtually-concatenated group (VCG) to include, in addition to its primary members as in a conventional implementation, at least one additional member, referred to herein as a "backup member," which does not transmit data traffic under normal operating conditions. Each of the primary and backup members of the VCG is assigned a data transmission route between first and second nodes of the network. The first and second nodes may be a source-sink node pair, an ingress-egress node pair, or any other pair of network nodes. If a route assigned to one of the primary members fails, the route assigned to the backup member is utilized for restoring data traffic of that primary member. Such an arrangement will be described in greater detail below in conjunction with FIGS. 1A and 1B.

Figure 1A:
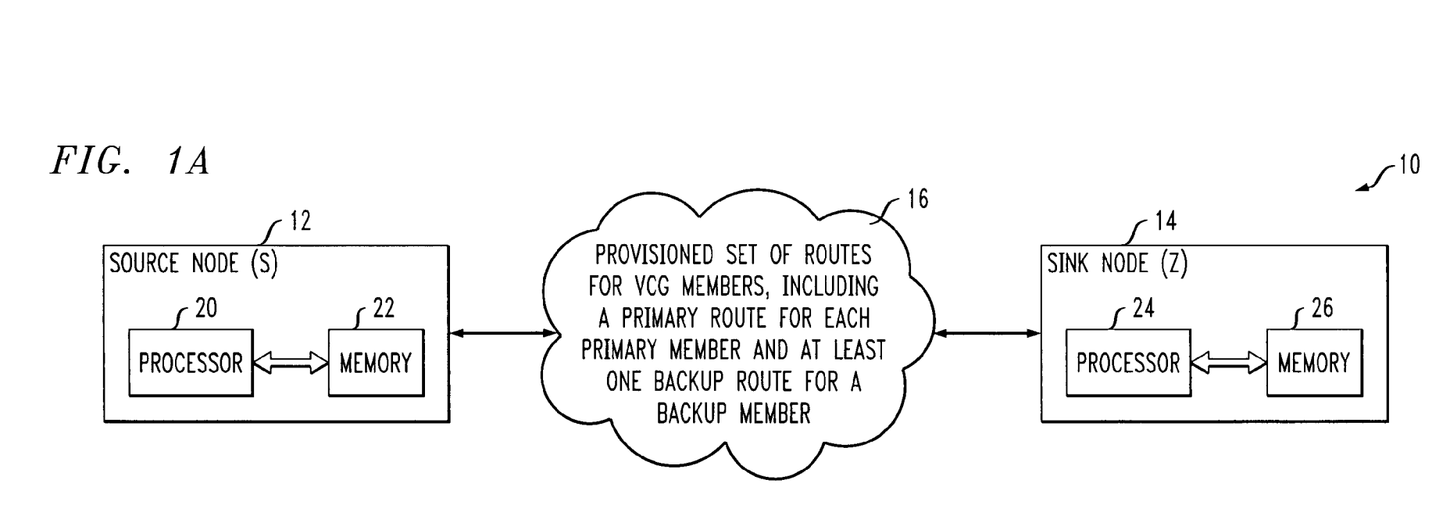
FIG. 1A illustrates a portion of a data transmission network in accordance with an illustrative embodiment of the invention.

Referring now to FIG. 1A, a data transmission network 10 includes a source node 12, a sink node 14, and a provisioned set of routes 16 for VCG members. It is to be appreciated that the figure shows only a portion of a typical network, for simplicity and clarity of description.

The source and sink nodes are also denoted herein as S and Z nodes, respectively. The source node 12 includes a processor 20 coupled to a memory 22. Similarly, the sink node 14 includes a processor 24 coupled to a memory 26. The memory elements of the nodes 12, 14 store one or more software programs for execution by the corresponding processors in implementing virtual concatenation operations such as forming VCGs and determining appropriate routes for VCG members, using the above-noted G.707 and G.7042 standards documents, or other communication protocols. The conventional aspects of the operation of nodes 12, 14 in transmitting virtually-concatenated data traffic through network 10 are well-known in the art and therefore will not be described in detail herein.

In accordance with the techniques described in the above-cited U.S. patent application Ser. No. 10/446,220, the VCG for which the set of routes 16 are provisioned includes a plurality of primary members and at least one backup member.

A "primary member" as the term is used herein refers generally to a conventional VCG member which is associated with a corresponding data stream to be transmitted from the source node to the sink node under normal operating conditions.

A "backup member" as the term is used herein refers generally to an additional VCG member which is not associated with any particular data stream to be transmitted from the source node to the sink node under normal operating conditions.

The FIG. 1A arrangement is thus in contrast to conventional VCGs, in which each member is a primary member and there are no backup members.

It is generally preferably to form the VCG so as to include the minimum number of backup members required to protect the entire VCG against a single route failure.

For example, in an embodiment in which all of the primary members are diversely routed from source node 12 to sink node 14, only a single backup member may be used. Therefore, in a VCG formed to include N primary members and one backup member, each having the same bandwidth allocation, protection against the single route failure requires a bandwidth overhead that is only a fraction 1/N of the 100% bandwidth overhead associated with certain of the previously-described conventional techniques.

As another example, in an embodiment in which all of the primary members are not diversely routed, a minimum number of required backup members may be determined based on the link that carries data traffic from the greatest number of members. Generally, the minimum number of backup members required would be the same as the total number of primary members carried by the link supporting the greatest number of primary members.

Such an embodiment may be viewed as including, for example, a number $N_X$ of primary members and a number $N_Y$ of backup members, with diverse routing provided between the primary and backup members, but not necessarily within the set of $N_X$ primary members or $N_Y$ backup members.

In the above examples, configuring the VCG results in a substantial reduction in bandwidth overhead relative to conventional SONET 1+1 primary-backup protection. As described previously, this conventional approach requires that each primary route have a corresponding backup route, resulting in 100% bandwidth overhead. In the illustrative embodiments, the bandwidth overhead decreases with the diversity of the routes of the primary members, and as noted above, for N diversely routed primary members may be as low as a fraction 1/N of the conventional 100% bandwidth overhead requirement.

It was indicated above that the one or more backup members of the VCG are not used to transmit data traffic under normal operating conditions. However, in the event of the failure of a route associated with one or more of the primary members, the affected data traffic may be restored utilizing the backup member(s). For example, if the source node 12 detects the failure of the route assigned to a given member, as reported by the sink node 14 or otherwise, it "discards" the failed member and starts sending the corresponding data traffic on a backup member. Advantageously, this switching of data traffic in the illustrative embodiments can be achieved in a very short amount of time, in some cases as short as about two milliseconds.

It should be noted that a single backup member need not be capable of restoring all of the data traffic associated with a given failed primary member. For example, in alternative embodiments, one or more backup members may each be utilized for partial restoration of the data traffic of a given failed primary member. The term "restoring data traffic" and similar terminology used herein should be understood to include without limitation full or partial restoration of data traffic of a failed primary member by one or more backup members.

Figure 1B:
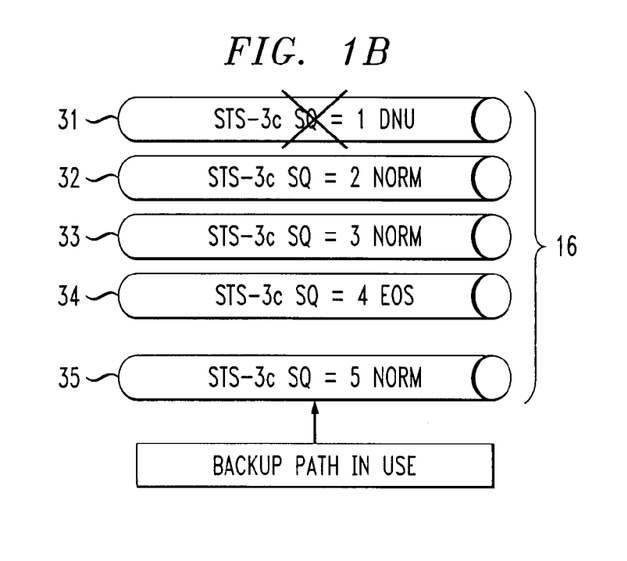
FIG. 1B shows an example of a provisioned set of routes for a given virtually-concatenated group (VCG) configured in accordance with the invention.

FIG. 1B shows a more particular example of the provisioned set of routes 16 in network 10 of FIG. 1A. In this example, the corresponding VCG is formed to include a total of five members, with four primary members and one backup member. The primary members and their associated routes are designated as elements 31, 32, 33 and 34 in the figure. The backup member and its associated route is designated as element 35 in the figure. The members 31 through 35 have respective sequence (SQ) numbers 1 through 5.

Each of the primary and backup members has the same bandwidth in this example. More specifically, each of the members is configured to support data traffic associated with a conventional STS-3c data rate signal, where STS denotes "synchronous transport signal." The VCG in this example may be referred to as an STS-Xc-Yv VCG, where X=3 and Y in this case denotes the number of primary and backup members of the group.

It should be understood, however, that the invention does not require the use of any particular signal or bandwidth configuration for the individual members, or that all members have the same signal or bandwidth configuration.

Backup member 35 does not carry any data traffic during normal operation. The source node 12 therefore transmits a DO NOT USE (DNU) indicator in the LCAS control word (CTRL) for the backup member 35 during normal operation to ensure that the sink node does not pick up any data traffic from backup member 35.

The example of FIG. 1B more particularly illustrates not this normal operation condition, but instead a failure condition in which at least a portion of the route associated with primary member 31 has failed. Such a route failure is an example of what is more generally referred to herein as a "member failure." It is to be appreciated, however, that the term "member failure" as used herein is intended to include any type of failure associated with the corresponding primary member that prevents it from transmitting data at the desired rate.

A given failure may be signaled in accordance with the conventional LCAS protocol, in which the sink node 14 detects the failure and reports the status of the failed member as NOT-OK back to the source node 12.

Upon receiving notification of a member failure, the source node 12 switches the data traffic from the failed primary member to the backup member, and transmits a NORMAL (NORM) indicator in the LCAS control word for the backup member and the DNU indicator in the LCAS control word for the failed primary member.

As shown in FIG. 1B, as a result of this restoration process, the NORM indicator is transmitted for primary members 32, 33 and 34 and for the backup member 35, and the DNU indicator is transmitted for the failed primary member 31.

This illustrative embodiment thus distinguishes primary members from backup members of a given VCG under normal operation by sending the NORM indicator in the LCAS control words of the primary members and the DNU indicator in the LCAS control words of the backup members. In accordance with the foregoing description, the source node may be viewed as being operative, upon receiving notification of the failure of a primary member, to "swap" the NORM indicator value of the LCAS control word of the failed primary member, with the DNU indicator value of the LCAS control word of one of the backup members, in the next multiframe. At the end of the multiframe header, the source node may start putting the data on the backup member instead of the failed primary member. Therefore, from the time the source node has received the notification of failure, it generally takes one complete multiframe, that is, two milliseconds or eight milliseconds for respective higher order (HO) and lower order (LO) implementations, before the backup member can start carrying the data of the failed primary member.

The exemplary restoration technique described above in conjunction with FIGS. 1A and 1B can achieve a fast restoration time, as low as about two milliseconds in some cases, through the use of the above-noted modified LCAS protocol. Instead of using multiframe indicator (MFI) bits to send member status information from the sink node 14 to the source node 12, the modified LCAS protocol utilizes extra bits taken from reserve bits defined in the above-noted standards documents to send the member status information. Therefore, in the event of a member failure, the sink node can immediately send to the source node the status of the failed member instead of waiting for its turn to arrive in the refresh cycle. An important advantage of this approach is that it avoids the restoration delay problems attributable to excessive refresh time in the conventional LCAS protocol. Additional details regarding the modified LCAS protocol can be found in the above-cited U.S. patent application Ser. No. 10/446,220.

Figure 2:
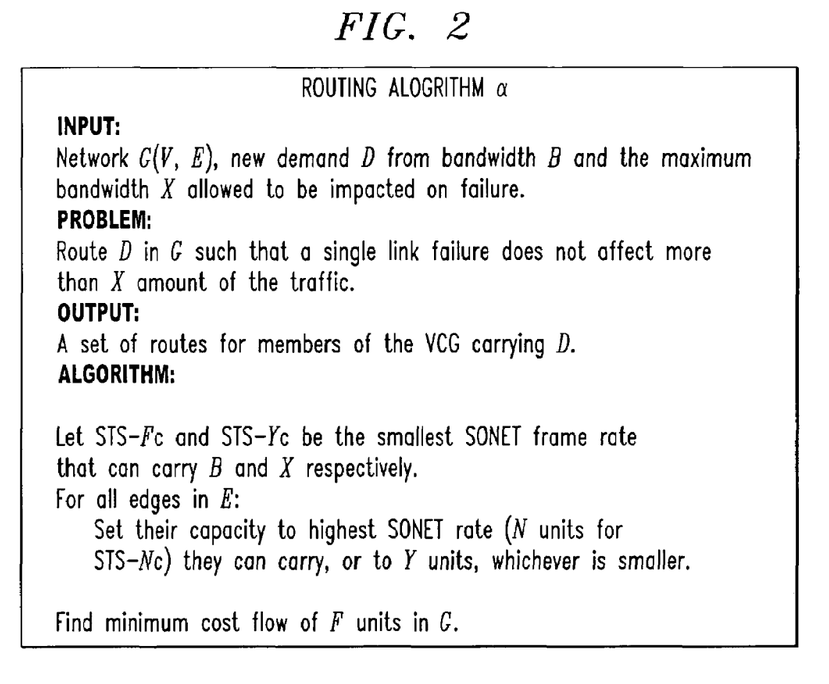
FIGS. 2, 3 and 4 show exemplary routing algorithms utilizable for determining routes through the data transmission network of FIG. 1A in accordance with the invention.
Figure 3:
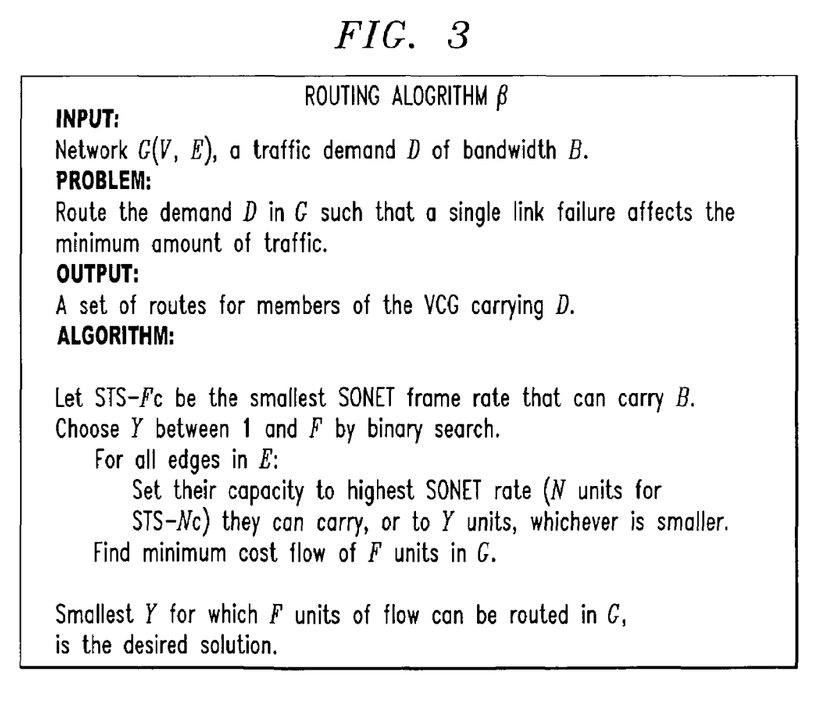
Figure 4:
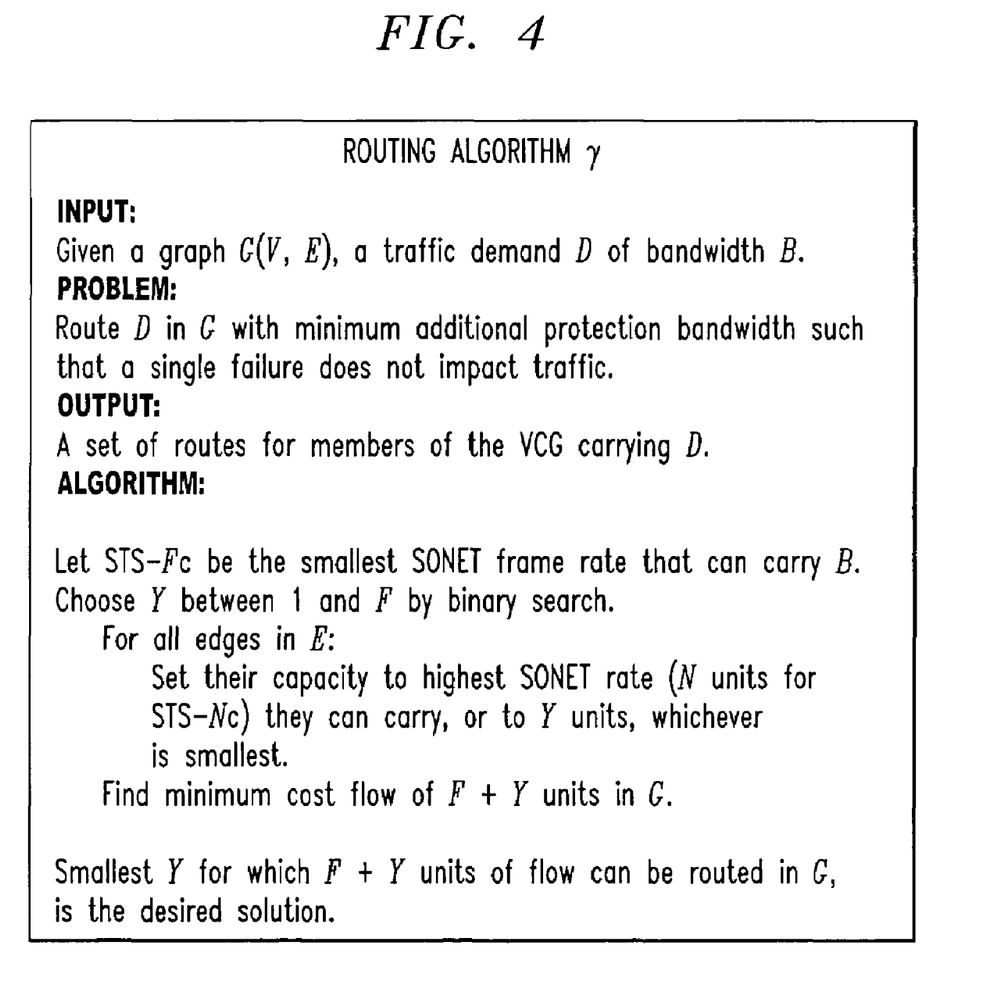

A number of exemplary routing algorithms for determining routes through the data transmission network of FIG. 1A in accordance with the present invention will now be described with reference to FIGS. 2, 3 and 4. The routing algorithms in FIGS. 2, 3 and 4 are referred to herein as routing algorithms $\alpha$, $\beta$ and $\gamma$, respectively, and correspond to routing service scenarios A, B and C, respectively. It should be emphasized that the particular scenarios, and the corresponding algorithms, are presented by way of example, and other embodiments may utilize different scenarios or routing algorithms. For example, the described routing algorithms can be readily extended to other scenarios with alternate bandwidth constraints.

As will be described below, scenarios A and B require no over-provisioning of bandwidth but have strict limitations on the acceptable service loss on failure. These scenarios are examples of what are referred to herein as "no over-provisioning" or NOP scenarios. In contrast, scenario C utilizes over-provisioning to achieve protection. Such a scenario is an example of what is referred to herein as a "require over-provisioning" or ROP scenario.

Scenario A generally involves routing a given data service, for example, a particular gigabit (Gb) Ethernet service, such that a single node or link failure does not affect more than a designated amount X of the total bandwidth. This type of scenario may arise when traffic is provisioned for a peak rate but a service provider needs to ensure that an average rate, such as 30% below the peak rate, is maintained even after failures.

Scenario B generally involves routing a data service such that a single node or link affects the minimum bandwidth.

Scenario C generally involves routing a data service with over-provisioning such that minimum overbuild is required to protect against a single node or link failure.

The routing algorithms $\alpha$, $\beta$ and $\gamma$ described in conjunction with FIGS. 2, 3 and 4, respectively, are designed to exploit the flexibility provided by the VCG structure as previously described in conjunction with FIGS. 1A and 1B.

FIG. 2 shows the routing algorithm $\alpha$ for scenario A. As indicated above, this type of scenario may arise when traffic is provisioned for a peak rate but a service provider needs to ensure that a certain average rate is maintained even after failures. This is likely to be a common scenario in practice as service providers may not be willing to provide additional bandwidth in order to protect data services. However, such service providers will often be interested in limiting the extent of the damage on failures. Moreover, critical services tend be provisioned at their peak rates, and thus a temporary failure may not necessarily impact end user performance.

Routing algorithm $\alpha$ takes as input a network representation G(V, E), which generally denotes a graph G comprising a set of vertices V interconnected by edges E. The vertices and edges are also referred to herein as nodes and links, respectively. The input also includes a traffic demand D, illustratively referred to as a "new" demand, for an amount of bandwidth B, and a maximum amount of bandwidth X that may be impacted on failure. The routing problem addressed by algorithm $\alpha$ may be characterized as routing the demand D in G such that a single link failure does not affect more than the designated maximum amount X. The output of algorithm $\alpha$ is a set of routes for members of the VCG carrying the demand D.

The operation of algorithm $\alpha$ is as follows. Algorithm a initially lets STS-Fc and STS-Yc be the smallest SONET frame rates that can carry B and X, respectively. This allows F and Y to be determined from B and X, respectively. For each of the edges in E, algorithm $\alpha$ sets the corresponding capacity either to N units of flow, identified by determining the highest SONET rate STS-Nc that can be carried by the edge, or to Y units of flow, whichever is the smaller of the two. Thus, all link capacities in G reflect the largest SONET rate that can be carried and are restricted to a maximum of Y units. Then, algorithm $\alpha$ finds a minimum-cost feasible flow of F units of flow in the graph G. In other words, algorithm $\alpha$ determines an appropriate routing for F units of flow through the graph G.

Any type of conventional flow routing algorithm may be used to determine the feasible flow for F units of flow in the graph G. For example, path augmentation based maximum flow algorithms may be used, such as those described in L. R. Ford, Jr., "Flows in Network," Princeton University Press, 1962, and J. Edmonds and R. M. Karp, "Theoretical Improvements in Algorithmic Efficiency for Network Flow Problems," Journal of ACM, Vol. 19, No.2, 1990, both of which are incorporated by reference herein. Since the requirement is only to route F units of flow, these flow routing algorithms can be stopped once the sufficient flow is routed.

In any given network, there may be various distinct solutions for routing F units of flow, and thus algorithm $\alpha$ determines the minimum-cost solution. Such minimum-cost feasible flow solutions can be computed using conventional minimum-cost flow algorithms. Exemplary minimum-cost flow algorithms are described in R. K. Ahuja et al., "Network Flows: Theory, Algorithms, and Applications," Prentice Hall, 1993, J. B. Orlin, "A Faster Strongly Polynomial Minimum Cost Flow Algorithm," Proc. of the 20th ACM Symposium on the Theory of Computing, pp.377-387, 1988, and W. S. Jewell, "Optimal Flow through Networks," Interim Technical Report 8, Operations Research Center, MIT, Cambridge, Mass., all of which are incorporated by reference herein.

The determined minimum-cost feasible flow identifies the set of routes for members of the VCG carrying the demand D. More specifically, once F units of flow are routed through G, F paths of unit flow may be extracted and each path may then be used to route a VCG member made up of an STS-1 circuit.

The foregoing embodiment assumes that the VCG members are representable as or otherwise comprise STS-1 circuits. It should be understood that these and other assumptions referred to herein are not requirements of the invention, and need not apply in other embodiments. For example, in alternative embodiments, the VCG members may comprise other types of circuits, such as STS-3 circuits, as will be described elsewhere herein.

As an example of the operation of algorithm $\alpha$, consider a scenario in which the requirement is to transport a 120 Mbps Ethernet service from a source node to a sink node such that a single failure does not impact more than $\frac{2}{3}$ (67%) of the traffic. Transporting a 120 Mbps Ethernet service requires an STS-3c ($\approx$156 Mbps) equivalent SONET frame rate. In accordance with current VC protocols, this can be achieved by either one STS-3c circuit or three STS-1 circuits. The tradeoffs between selecting STS-1 and STS-3c members will be described in greater detail below. Assume for the present example that the 120 Mbps Ethernet service is transported on a three-member STS-1 VCG. Since the requirement in this example is that at least 40 Mbps of the traffic (33% of 120 Mbps) is protected against one failure, it is necessary for at least one STS-1 member to survive the failure.

As described above, algorithm $\alpha$ alters the link capacities such that the new link capacities reflect the largest SONET rate (STS-Nc) that can be carried. In the present example, a link with available bandwidth of 100 Mbps can carry only a single STS-1 circuit ($\approx$52 Mbps), and hence its updated capacity is one unit of flow. Also, to ensure that no link failure results in failure of more than two members in this example, no link may be permitted to carry more than two units of flow. This constraint is captured by restricting the link capacities to a maximum of two units. Thus, a link which could otherwise support an STS-3c circuit, or three units of flow, is assigned an updated capacity of only two units by algorithm $\alpha$ in the present example.

It should be noted that algorithm $\alpha$ as illustrated in FIG. 2 handles only link failures and not node failures. However, algorithm $\alpha$ can be augmented using a standard graph transformation that splits each node into an ingress node and an egress node and inserts a link of requisite capacity between them. Such a graph transformation is described in, for example, the above-cited R. K. Ahuja et al. reference. The other routing algorithms described herein may be modified in a similar manner to account for node failures. These remaining algorithms, like algorithm $\alpha$, will also be described as handling only link failures, with the understanding that the algorithms can be modified in a straightforward manner to handle node failures using a graph transformation or other suitable technique.

FIG. 3 shows the routing algorithm β for scenario B. This scenario is similar to scenario A except that the requirement is to minimize the extent of damage on failure. In a network with complete route diversity, all of the flows are routed on disjoint paths such that any failure will affect only a single unit flow. At the other extreme, in a network with no route diversity, all of the flows are carried on one route, and a failure will affect all of the flows. Therefore, the problem of minimizing the damage on failure may be generally viewed as finding a solution in between these two extremes. As will be described below, algorithm β achieves this objective in an effective manner.

Routing algorithm β takes as input a network representation G(V, E), and a traffic demand D for an amount of bandwidth B. The routing problem addressed by algorithm β may be characterized as routing the demand D in G such that a single link failure affects the minimum amount of traffic. The output of algorithm β is a set of routes for members of the VCG carrying the demand D.

The operation of algorithm β is as follows. Algorithm β initially lets STS-Fc be the smallest SONET frame rate that can carry B. Once F is determined from B in this manner, algorithm β chooses a value of Y, representing damage on failure, by doing a binary search between 1 and F. For each value of Y, algorithm β first alters the link capacities as in algorithm α and then attempts to route the flow of F units in G. For each value of Y, algorithm β attempts to find a solution, if such a solution exists, where bandwidth B can be routed such that no link failure will affect more than an STS-Yc amount of bandwidth, again assuming that VCG members comprise STS-1 circuits. The smallest value of Y for which F units of flow can be routed in G is the best solution.

FIG. 4 shows the routing algorithm γ for scenario C. This scenario permits the provisioning of an additional amount of bandwidth, beyond bandwidth B, which can be used to completely restore the circuit after a failure. As described previously herein in conjunction with FIGS. 1A and 1B, backup VCG members may be provisioned for this case. To minimize the number of additional VCG members required for protection, only the minimum number of members should be affected on failure. In other words, if Y ($1 \leq Y \leq F$) members are allowed for protection bandwidth, no link should carry flows from more than Y members, or equivalently no link should carry more than Y units of flow. Again, it is assumed that VCG members comprise STS-1 circuits, such that each member corresponds to a unit of flow. Thus, the problem of provisioning F members to transport a VCG of bandwidth B with complete protection can be characterized as routing F+Y units of flow in graph G such that no link carries more than Y units of flow.

Routing algorithm γ takes as input a network representation G(V, E), and a traffic demand D for an amount of bandwidth B. The routing problem addressed by algorithm γ may be characterized as routing the demand D in G with the minimum additional protection bandwidth such that a single link failure does not impact traffic. The output of algorithm γ is a set of routes for members of the VCG carrying the demand D.

The operation of algorithm γ is as follows. Algorithm γ initially lets STS-Fc be the smallest SONET frame rate that can carry B. Once F is determined from B in this manner, algorithm γ chooses a value of Y representing damage on failure, by doing a binary search between 1 and F. For each value of Y, algorithm γ first alters the link capacities as in algorithm α and then attempts to route the flow of F+Y units in G. For each value of Y, algorithm γ attempts to find a solution, if such a solution exists. The smallest value of Y for which F+Y units of flow can be routed in G is the best solution.

It should be noted that routing algorithm γ does not require that the primary and the backup members be diversely routed. This is a fundamental difference from standard protection algorithms that enforce this constraint. In fact, routing algorithm γ simply ensures that each link carries at most Y units of flow without enforcing any diversity. Therefore, if a link failure affected I active and J backup members, then $Y \geq I+J$. Since routing algorithm γ routed Y backup members (F+Y units of flow) in total, Y−J backup members will definitely survive the failure. However, $Y-J \geq L$. Therefore, it is guaranteed that at least I backup members are still present to support all the failed active members.

This loosening of the diversity requirement ensures that routing algorithm γ is also effective in smaller-size networks, and in networks having limited connectivity among nodes. Thus, routing algorithm γ is well-suited for use in many practical applications, such as those in which service providers gradually build up their mesh infrastructure.

As noted previously, the above description of the α, β and γ routing algorithms assumed a VCG with STS-1 members. Other types of VCG members may be considered, however, such as STS-3c members. The tradeoffs between STS-1 members and STS-3c members are as follows. Use of STS-1 members increases the probability of the requisite routes being found compared to an arrangement in which STS-3c members are used. However, higher network management overhead will also be incurred in the STS-1 case since there are three times as many members to be provisioned. Due to its lower granularity, STS-1 also enables a better match between the data rate of the service and the SONET rate for the VCG. Moreover, in an arrangement such as that described in conjunction with FIGS. 1A and 1B, which protects against a single failure, a VCG with STS-1 members will require a lower protection bandwidth compared to one with STS-3c members. Thus, it is generally preferred to build the VCG using STS-1 members unless the management overheads are prohibitive.

With regard to complexity, the assignment of link capacities to equivalent SONET rates has a complexity O(E). For algorithm α, use of a successive shortest path algorithm such as that described in the above-cited W. S. Jewell reference may require, in the worst case, F shortest path computations to route F units of flow, resulting in complexity O(FE log V). Thus, the worst-case complexity of algorithm α is O(FE log V). Algorithms β and γ both use binary search, which in the worst case may make log(F) invocations of the flow routing step. Thus, their worst-case complexity is given by O(FE log (F+V)).

It is important to note that F generally cannot be an arbitrary large number, since F in these example routing algorithms refers to the equivalent SONET frame rate (STS-Fc) to support a circuit of bandwidth B. The highest SONET frame rate currently defined by the standards is STS-768 and thus, F under these standards will never exceed 768.

The routing algorithms α, β and γ described above should be viewed as examples of routing algorithms in accordance with the invention, and the invention can be implemented using other types of routing algorithms. Another exemplary routing algorithm in accordance with the present invention will now be described.

This routing algorithm is utilizable in a scenario in which a Gb Ethernet circuit or other traffic demand is to be routed such that MVCG members are provided with 1+1 primary-backup protection, wherein each primary route has a corresponding backup route, while KVCG members are unprotected. As a more particular example, the values of M and K may be selected such that M=15 and K=6, although other values could of course be used. Advantageously, the routing algorithm to be described below provides in this scenario improved resiliency with less than 100% bandwidth overhead.

The routing problem addressed by the routing algorithm may be characterized as follows. Given a network representation G(V, E), route 2M+K units of total flow such that each of the 2M units comprises a two-route flow.

The algorithm first determines a minimum-cost flow routing for 2M+K units of flow such that no link carries more than M+K units of flow. If there exists a feasible flow graph of this type, then there exist M 1+1 protected routes and K unprotected routes in the feasible flow graph. The solution to the minimum-cost feasible flow determination provides the routes of smallest total cost.

The algorithm then iteratively extracts 1+1 protected routes from the feasible flow graph. More specifically, in each iteration i, the algorithm extracts a 1+1 route such that no link in a residual graph contains more than M+K−i units of flow.

The protection bandwidth required by this example routing algorithm, expressed in terms of a percentage, is given by:

$$\frac{M}{M+K}\ \%.$$

With regard to various possible failures of routes determined by this example routing algorithm, in the best case a failure only affects a link carrying the flow of a 1+1 protected member. In this case, there is no impact to the traffic since the traffic can be switched onto a corresponding backup. On the other hand, in the worst case, a failure affects a link carrying all the unprotected members. The traffic impact in this case is K members, or, expressed as a percentage of the total traffic:

$$\frac{K}{M+K}\ \%.$$

On average, assuming failures are equally likely, the traffic impact will be half of all the unprotected members. This is a traffic hit of K/2 members, or, expressed as a percentage of the total traffic:

$$\frac{K/2}{M+K}\ \%.$$

Again, the foregoing routing algorithm is presented by way of example, and other routing algorithms can be used in implementing the invention.

A given one of the routing algorithms described above, and an associated restoration technique, may be implemented in a network-based system comprising a plurality of network nodes. Exemplary network and network node implementations of the invention will now be described with reference to FIGS. 5, 6 and 7.

Figure 5:
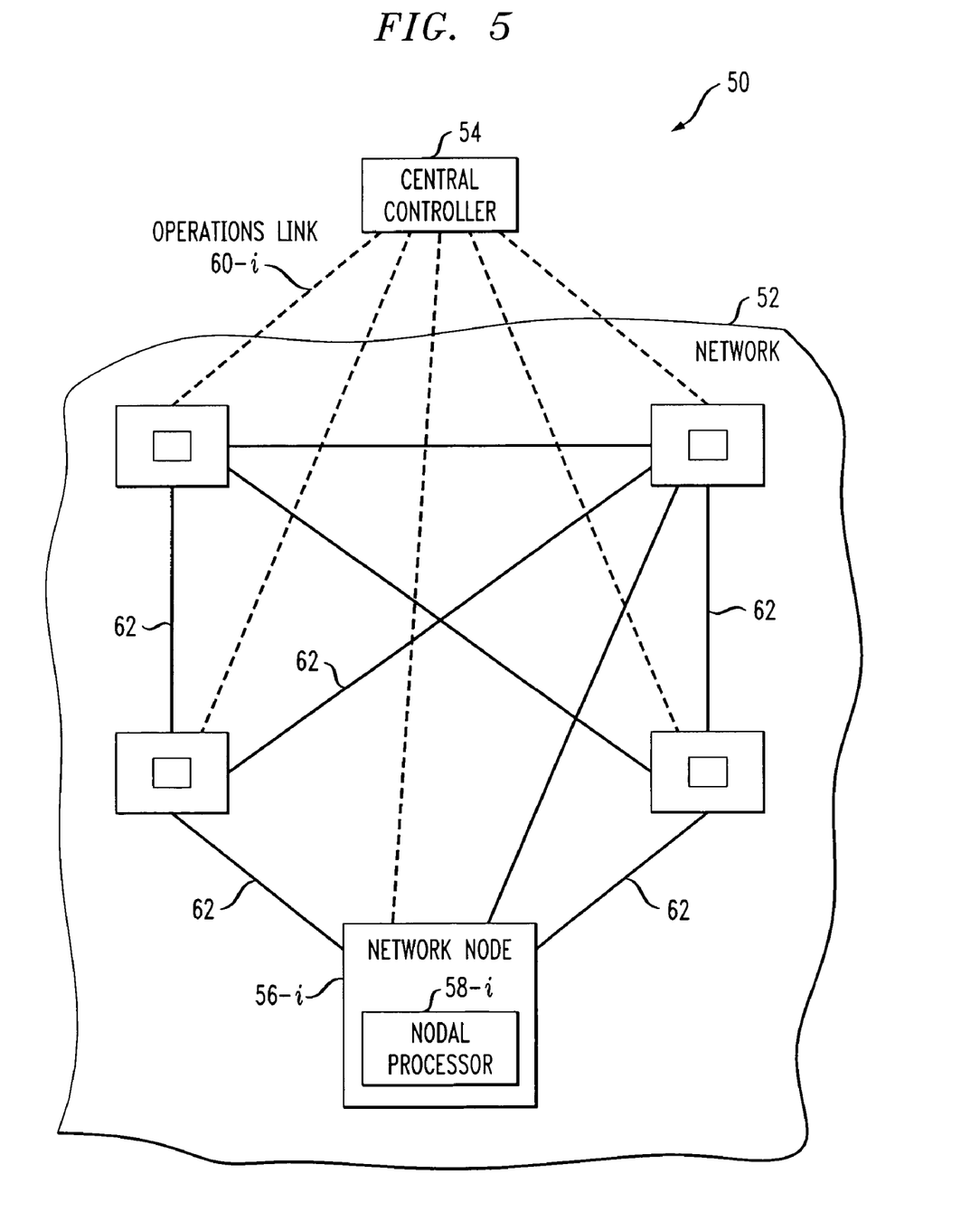
FIG. 5 shows an example network-based system in which a routing algorithm in accordance with the invention is implemented.

FIG. 5 shows an exemplary network-based system 50 in which techniques of the present invention can be implemented. The system 50 includes a network 52 and a central controller 54. The network 52 may comprise, by way of example, an Internet protocol (IP)-optical wavelength division multiplexed (WDM) mesh network, although the invention may be utilized with any type of network. The network 52 includes a number of nodes 56-i, i=1, 2, . . . N. Each of the nodes 56-i includes a corresponding nodal processor 58-i. The nodes 56-i of network 52 are interconnected by, for example, optical fiber connections 62. In this example, each of the nodes 56-i has a fiber connection to three other nodes. Each of the nodes 56-i is also connected to the central controller 54 via a corresponding operations link 60-i, shown as a dashed line in FIG. 5.

The central controller 54 and nodes 56-i may each represent a computer, server, router, gateway or other suitable digital data processor programmed to implement at least a portion of a routing algorithm and associated restoration technique of the present invention.

It should be noted that the system of FIG. 5 is considerably simplified for purposes of illustration. The invention is well-suited for use in large-scale regional, national and international networks which may include many subnetworks, each having hundreds of nodes.

The central controller 54 may or may not participate in network restoration, depending upon the particular implementation. For example, a fully distributed implementation need not utilize the central controller 54.

Figure 6:
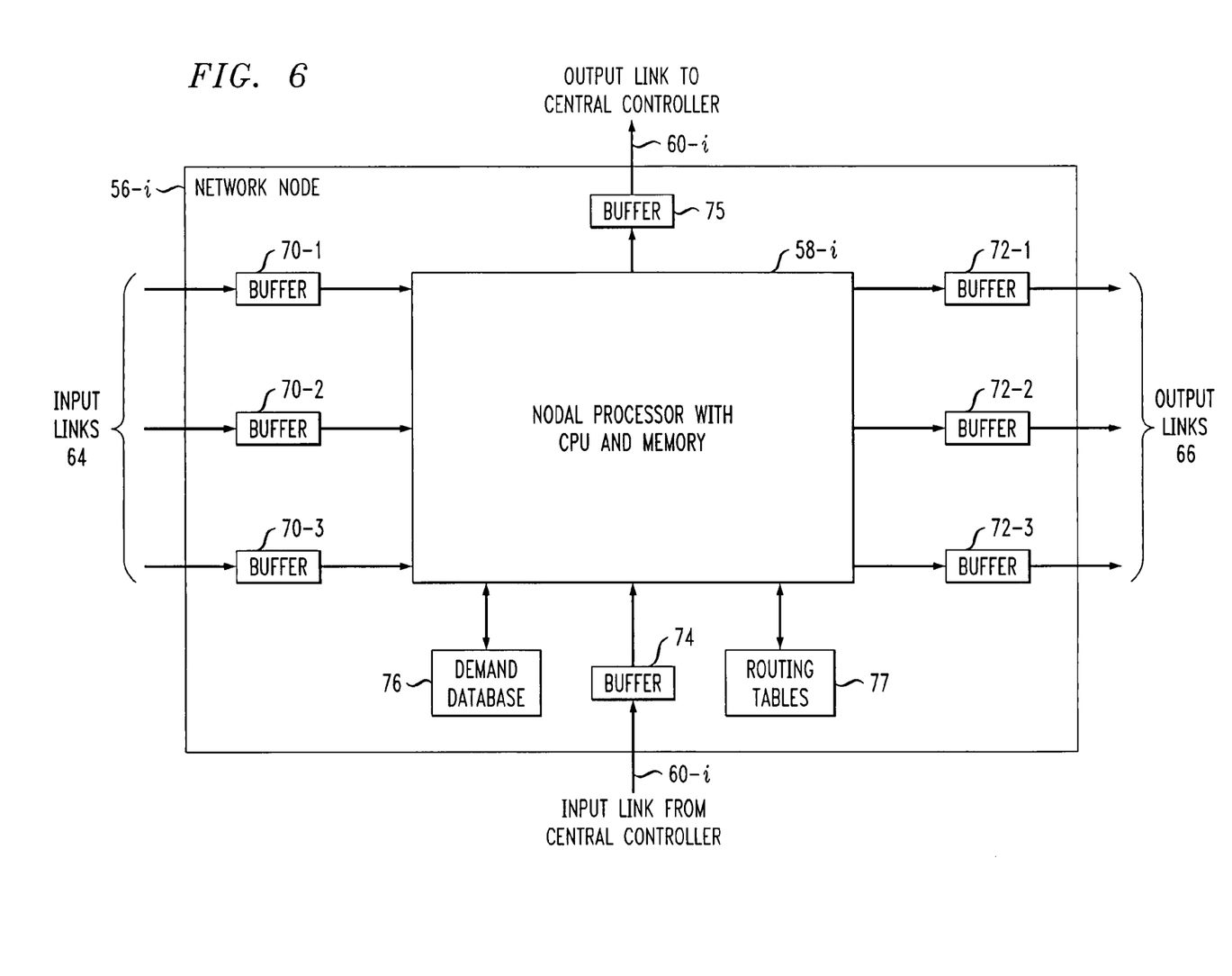
FIGS. 6 and 7 show different possible implementations of a given network node in the FIG. 5 system.

FIG. 6 shows one of the nodes 56-i of network 52 in greater detail. The node 56-i includes a nodal processor 58-i which includes a central processing unit (CPU) and memory. A set of input links 64, corresponding to fiber connections 62 with three other nodes, are connected to buffers 70-1, 70-2 and 70-3 in node 56-i. The node 56-i supplies signals to three other nodes via a set of output links 66 also corresponding to fiber connections 62. The output links 66 are connected to buffers 72-1, 72-2 or 72-3. The buffers 70-1, 70-2 and 70-3 may provide optical-to-electrical conversion for signals received on input links 64, while the buffers 72-1, 72-2 and 72-3 may provide electrical-to-optical conversion for signals to be transmitted on output links 66.

The operational link 60-i of node 56-i to the central controller 54 includes an input operational link which is coupled to nodal processor 58-i via an input buffer 74, and an output operational link which receives signals from nodal processor 58-i via an output buffer 75. The node 56-i also includes a demand database 76 for storing demands for network capacity, and a set of routing tables which specify routes through the network for particular demands. The demand database 76 and routing tables 77 may be components of a common memory within node 56-i, and may be combined with or otherwise associated with the memory of nodal processor 58-i. The node 56-i has been simplified for purposes of illustration, and as noted above may include a substantially larger number of input and output links, as required for a given application.

Figure 7:
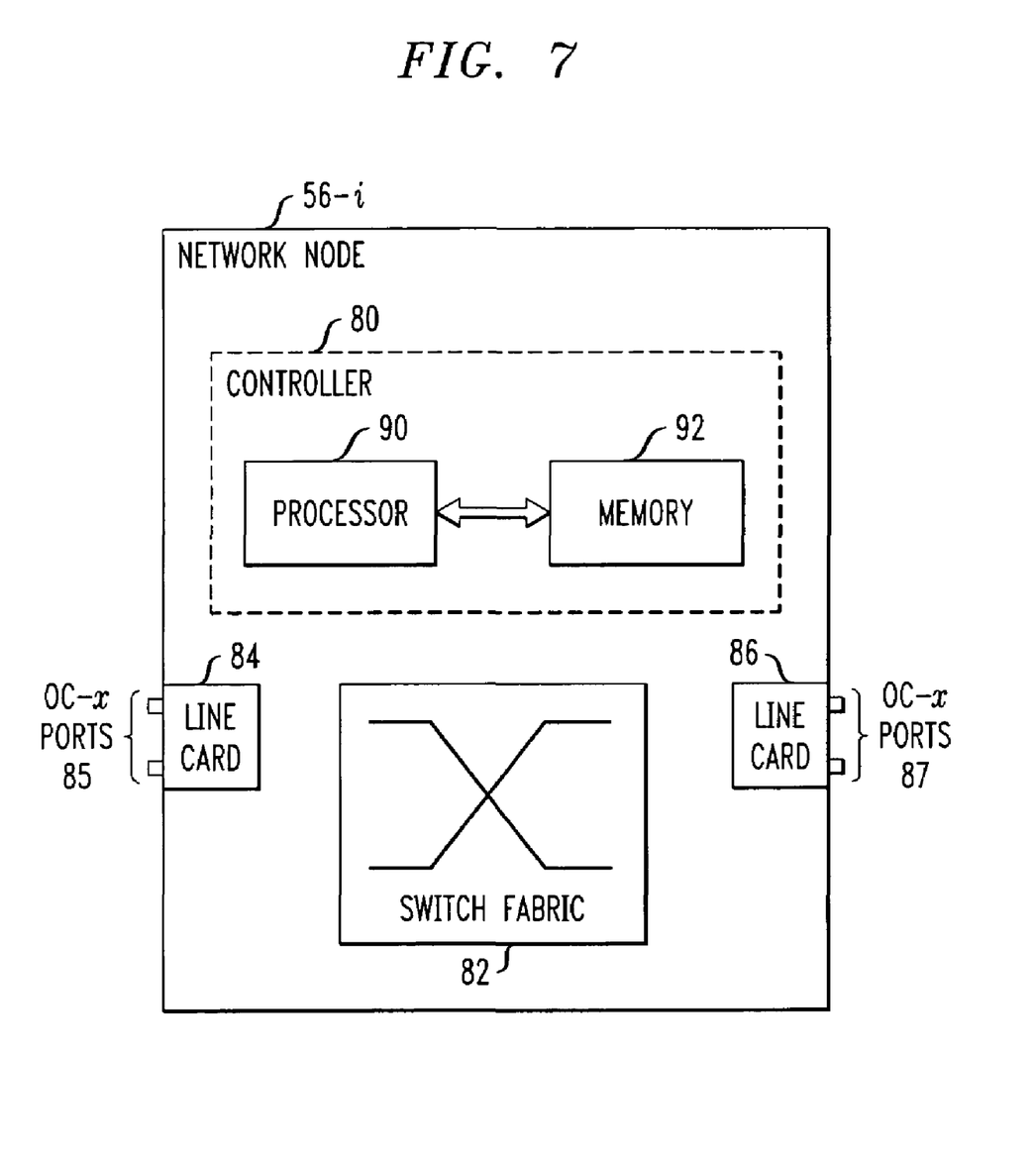

FIG. 7 shows another exemplary implementation of a given one of the network nodes 56-i of the FIG. 5 network-based system.

The network node 56-i in this example includes a controller 80, a switch fabric 82, a first line card 84 having a set of OC-x ports 85 associated therewith, and a second line card 86 having a set of OC-x ports 87 associated therewith. It should be understood that the node 56-i has again been simplified for purposes of illustration. For example, the node 56-i as shown in FIG. 7 may in practice include a substantially larger number of line cards and ports, as required for a given application.

The controller 80 includes a processor 90 and a memory 92. The processor 90 may be, e.g., a microprocessor, a microcontroller, an application-specific integrated circuit (ASIC) or other type of processing device, as well as portions or combinations of such devices. The memory 92 may include an electronic random access memory (RAM), a read-only memory (ROM) or other type of storage device, as well as portions or combinations of such devices. The memory 92 may be used to store a demand database for storing demands for network capacity, and a set of routing tables which specify routes through a corresponding network for particular demands, with the routes being determined at least in part using a routing algorithm of the present invention.

As indicated previously, the node 56-i may be an element of an optical network or other type of network which includes a very large number of nodes, and possibly a central controller. One or more of the nodes and the central controller may each represent a computer, processor-based switch or other type of processor-based device configured to provide routing and associated restoration in accordance with the invention.

The implementations described in conjunction with FIGS. 5, 6 and 7 are presented by way of example, and it is to be appreciated that the invention can be implemented in numerous other applications.

Advantageously, the present invention provides improved routing algorithms which facilitate the implementation of low-overhead, standards-compliant fast restoration techniques for EoS data traffic or other types of data traffic which utilize virtual concatenation.

Another advantage of the techniques in the illustrative embodiments is that these techniques may be configured for backwards compatibility with existing VC and LCAS standards, thereby allowing a network element configured to implement a restoration technique of the present invention to interoperate with standard VC and LCAS enabled network elements.

The above-described embodiments of the invention are intended to be illustrative only. For example, the restoration techniques of the invention may be applied to any routing application, without regard to the type, arrangement or configuration of the network, network nodes, or communication protocols.

For example, although described in the context of virtually-concatenated data traffic, the example routing algorithms described herein can be modified in a straightforward manner so as to be applicable to a wide variety of other types of data traffic, including data traffic that does not utilize virtual concatenation.

Also, in alternative embodiments the particular steps utilized in a given routing algorithm may be varied from those steps shown in the foregoing example routing algorithms.

These and numerous other alternative embodiments within the scope of the following claims will be readily apparent to those skilled in the art.

We claim:

1. A method of routing virtually-concatenated data traffic in a network comprising at least first and second nodes, the method comprising the steps of:
    identifying a traffic demand; and
    determining a plurality of routes for routing the traffic demand through the network, with each of the routes corresponding to a member of a virtually-concatenated group, such that different portions of the traffic demand are assigned to different members of the virtually-concatenated group;
    wherein the routes are determined utilizing a routing algorithm that determines the routes by processing a representation of the network; and
    wherein the routing algorithm determines the routes in a manner that ensures that failure of a single link in the network does not affect more than a designated maximum amount X of a bandwidth B of the traffic demand.

2. The method of claim 1 wherein the routing algorithm determines the routes by determining a feasible flow of F units of flow in the network representation.

3. The method of claim 2 wherein the determined feasible flow comprises the routes corresponding to members of the virtually-concatenated group.

4. The method of claim 1 wherein the routing algorithm determines variables F and Y from B and X, respectively, with STS-Fc and STS-Yc denoting smallest SONET frame rates that can carry B and X, respectively.

5. The method of claim 4 wherein for each of a plurality of links in the network representation, the routing algorithm sets a corresponding capacity either to N units of flow, identified by determining a highest SONET rate STS-Nc that can be carried by the link, or to Y units of flow, whichever is the smaller of the two, such that each of the capacities reflects the highest SONET rate that can be carried by the corresponding link subject to a restriction of a maximum of Y units.

6. A method of routing virtually-concatenated data traffic in a network comprising at least first and second nodes, the method comprising the steps of:
    identifying a traffic demand; and
    determining a plurality of routes for routing the traffic demand through the network, with each of the routes corresponding to a member of a virtually-concatenated group, such that different portions of the traffic demand are assigned to different members of the virtually-concatenated group;
    wherein the routes are determined utilizing a routing algorithm that determines the routes by processing a representation of the network; and
    wherein the routing algorithm determines the routes in a manner that ensures that failure of a single link in the network affects a minimum amount of a bandwidth B of the traffic demand.

7. The method of claim 6 wherein the routing algorithm determines a variable F from B, with STS-Fc denoting a smallest SONET frame rate that can carry B.

8. The method of claim 7 wherein the routing algorithm determines a value for a variable Y by performing a binary search between 1 and F.

9. The method of claim 8 wherein for each of a plurality of values of Y, the routing algorithm determines a minimum-cost feasible flow of F units of flow in the network representation such that no link failure will affect more than an STS-Yc amount of the traffic demand bandwidth B, the routing algorithm utilizing a minimum-cost feasible flow determined for the smallest value of Y to identify the routes corresponding to members of the virtually-concatenated group.

10. A method of routing virtually-concatenated data traffic in a network comprising at least first and second nodes, the method comprising the steps of:
    identifying a traffic demand; and
    determining a plurality of routes for routing the traffic demand through the network, with each of the routes corresponding to a member of a virtually-concatenated group, such that different portions of the traffic demand are assigned to different members of the virtually-concatenated group;
    wherein the routes are determined utilizing a routing algorithm that determines the routes by processing a representation of the network; and wherein the routing algorithm determines the routes in a manner that requires only a minimum amount of additional protection bandwidth to ensure that failure of a single link in the network will not affect a bandwidth B of the traffic demand.

11. The method of claim 10 wherein the routing algorithm determines a variable F from B, with STS-Fc denoting a smallest SONET frame rate that can carry B.

12. The method of claim 11 wherein the routing algorithm determines a value for a variable Y by performing a binary search between 1 and F.

13. The method of claim 12 wherein for each of a plurality of values of Y, the routing algorithm determines a minimum-cost feasible flow of F+Y units of flow in the network representation, the routing algorithm utilizing a minimum-cost feasible flow determined for the smallest value of Y to identify the routes corresponding to members of the virtually-concatenated group.

14. A method of routing virtually-concatenated data traffic in a network comprising at least first and second nodes, the method comprising the steps of:
    identifying a traffic demand; and determining a plurality of routes for routing the traffic demand through the network, with each of the routes corresponding to a member of a virtually-concatenated group, such that different portions of the traffic demand are assigned to different members of the virtually-concatenated group;
    wherein the routes are determined utilizing a routing algorithm that determines the routes by processing a representation of the network; and
    wherein the routing algorithm determines the routes in a manner that provides a designated number M of the members of the virtually-concatenated group with 1+1 primary-backup protection, wherein each primary route has a corresponding backup route, while a designated number K of the members of the virtually-concatenated group are not provided with such protection.

15. The method of claim 14 wherein the routing algorithm first determines a minimum-cost feasible flow routing for 2M+K units of flow such that no link of the network representation carries more than M+K units of flow, and then iteratively extracts 1+1 protected routes from a representation of the determined minimum-cost feasible flow by extracting, in each iteration i, a 1+1 protected route such that no link in a corresponding residual representation contains more than M+K−i units of flow.

16. The method of claim 1, wherein the determining step is implemented at least in part in software running on a processor of a node or other element of the network.

17. An apparatus for use in routing virtually-concatenated data traffic in a network comprising at least first and second nodes, the apparatus comprising:
    a processor; and
    a memory coupled to the processor;
    wherein the processor is operative to determine a plurality of routes for routing a given traffic demand through the network, with each of the routes corresponding to a member of a virtually-concatenated group, such that different portions of the traffic demand are assigned to different members of the virtually-concatenated group;
    wherein the routes are determined utilizing a routing algorithm that determines the routes by processing a representation of the network; and
    wherein the routing algorithm determines the routes in a manner that ensures that failure of a single link in the network does not affect more than a designated maximum amount X of a bandwidth B of the traffic demand.

18. An article of manufacture comprising a machine-readable medium storing one or more programs for use in routing virtually-concatenated data traffic in a network comprising at least first and second nodes, the one or more programs when executed in a processor responsive to a given traffic demand determining a plurality of routes for routing the given traffic demand through the network, with each of the routes corresponding to a member of a virtually-concatenated group, such that different portions of the traffic demand are assigned to different members of the virtually-concatenated group, wherein the routes are determined utilizing a routing algorithm that determines the routes by processing a representation of the network, and wherein the routing algorithm determines the routes in a manner that ensures that failure of a single link in the network does not affect more than a designated maximum amount X of a bandwidth B of the traffic demand.

* * * * *